United States Patent
Han

(10) Patent No.: US 7,428,146 B2
(45) Date of Patent: Sep. 23, 2008

(54) COMPUTER ENCLOSURE

(75) Inventor: Shao-Bo Han, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 236 days.

(21) Appl. No.: 11/344,444

(22) Filed: Jan. 30, 2006

(65) Prior Publication Data
US 2006/0209501 A1 Sep. 21, 2006

(30) Foreign Application Priority Data
Mar. 19, 2005 (CN) .................... 2005 2 0056117 U

(51) Int. Cl.
G06F 1/16 (2006.01)
A47B 97/00 (2006.01)
(52) U.S. Cl. .................... 361/683; 312/223.2
(58) Field of Classification Search ............. 312/223.2, 312/231.1; 361/724–727, 685–686, 683, 361/801
See application file for complete search history.

(56) References Cited
U.S. PATENT DOCUMENTS
6,053,586 A * 4/2000 Cook et al. ............. 312/223.2
6,392,874 B1 * 5/2002 Gan ........................... 361/683
6,583,983 B1 * 6/2003 Chen et al. .................. 361/683
6,932,447 B2 8/2005 Chen et al.
2003/0081399 A1 * 5/2003 Davis et al. ................. 361/818
2003/0107304 A1 * 6/2003 Chen et al. ............... 312/223.2

* cited by examiner

Primary Examiner—Lisa Lea-Edmonds
Assistant Examiner—Nidhi Desai
(74) Attorney, Agent, or Firm—Morris Manning Martin LLP; Tim Tingkang Xia, Esq.

(57) ABSTRACT

A computer enclosure includes a chassis, a fixing member, an elastic member, and a side panel. The chassis includes a rear panel, a front panel, a top panel, and a bottom panel forming an opening together. The rear panel defines an aperture. The fixing member is slidably mounted on the rear panel. A fixing hole corresponding to the aperture is defined in the fixing member. A pressing tab extends forwardly and downwardly from a top of the fixing hole. The elastic member is connected to the rear panel and the fixing member. The side panel can cover the opening of the chassis. A bent sheet is bent inwardly from a rear side of the side panel. A hook extends forwardly from an edge of the bent sheet. The hook includes a first guiding surface extending forwardly and downwardly at a top of the hook, corresponding to the pressing tab.

15 Claims, 6 Drawing Sheets

COMPUTER ENCLOSURE

BACKGROUND OF THE INVENTION

1. Field of the Invention

The present invention relates to computer enclosures, and more particularly to a computer enclosure which has a side panel that can be independently and readily secured to the computer enclosure by a fixing member.

2. Background of the Invention

A typical contemporary personal computer enclosure accommodates a number of electronic devices therein. The enclosure needs to be opened on a number of occasions for a variety of reasons, such as for replacing a defective electronic device with a new one. Therefore, the enclosure should be able to be readily opened and subsequently reassembled.

A conventional computer enclosure includes a base, side panels, and a top panel. The side panels and the top panel are respectively secured to the base of the enclosure with separate securing elements. A plurality of locking slots is defined in the base. A plurality of locking tabs is formed on the side panels and the top panel, for engagement into the locking slots of the base. Screws are then used to secure the side panels and the top panel to the base.

A tool is required for installation and removal of the screws. This is unduly inconvenient and time-consuming. An example of the above-mentioned mechanism is disclosed in U.S. Pat. No. 5,600,540.

What is needed is to provide a computer enclosure having a side panel which can be independently and readily secured thereto.

SUMMARY

An exemplary computer enclosure includes a chassis, a fixing member, an elastic member, and a side panel. The chassis includes a rear panel, a front panel opposite to the rear panel, a top panel, and a bottom panel which forming an opening together. The rear panel defines an aperture near the opening. The fixing member is slidably mounted on an inner surface of the rear panel. A fixing hole corresponding to the aperture of the rear panel is defined in the fixing member. A pressing tab extends forwardly and downwardly from the fixing member at a top of the fixing hole. One end of the elastic member is connected to the rear panel. And the other end of the elastic member is connected to the fixing member. The side panel can cover the opening of the chassis. A bent sheet is bent inwardly from a rear side of the side panel. A hook corresponding to the fixing hole of the fixing member extends forwardly from an edge of the bent sheet. The hook includes a first guiding surface extending forwardly and downwardly at a top of the hook, corresponding to the pressing tab of the fixing member.

Other advantages and novel features of the invention will become more apparent from the following detailed description taken conjunction with the accompanying drawings, in which:

DETAILED DESCRIPTION OF THE EMBODIMENT

Figure 1:
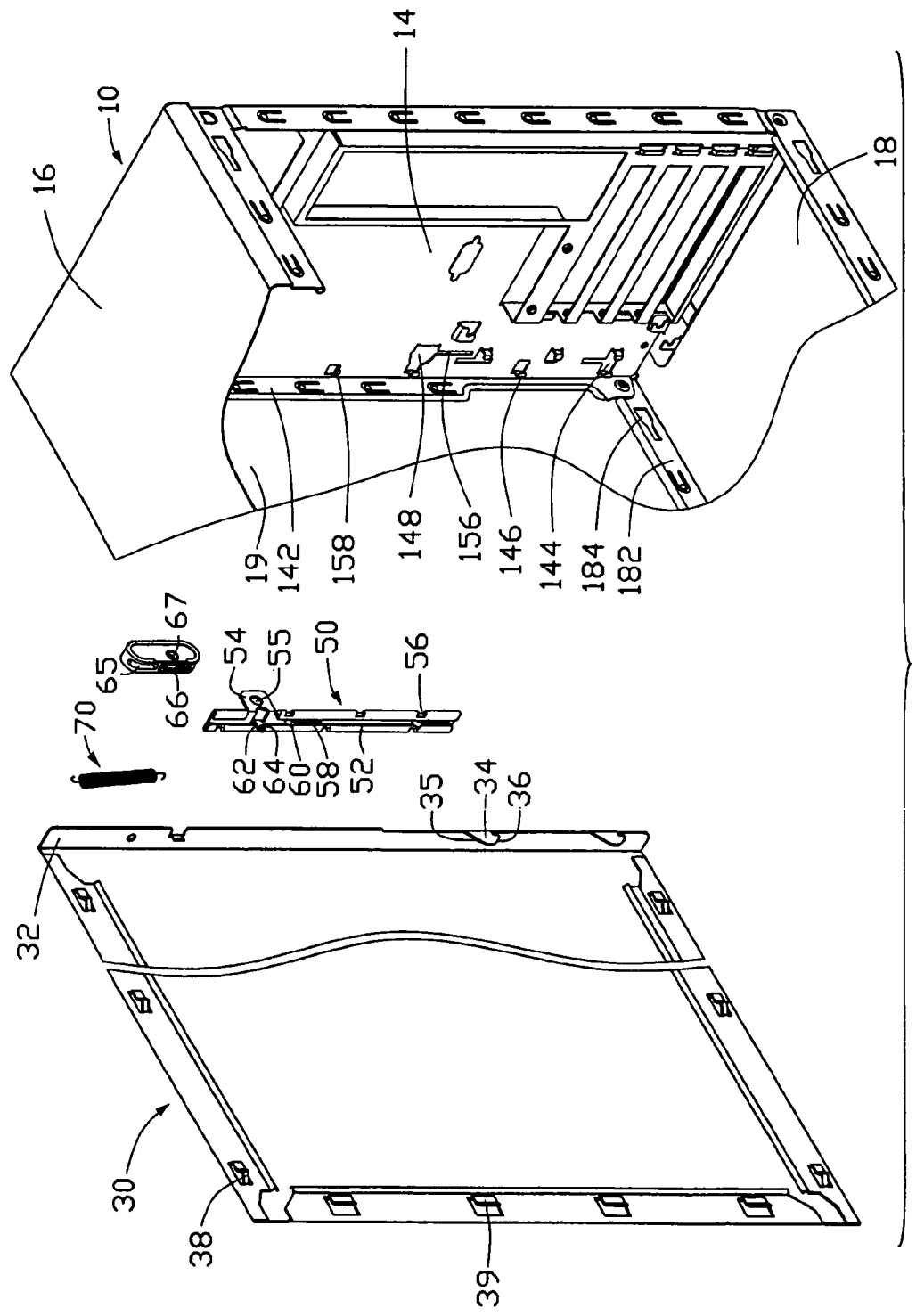
FIG. 1 is an exploded, isometric view of a computer enclosure in accordance with a preferred embodiment of the present invention, the computer enclosure including a chassis, a side panel, a fixing member and an elastic member.
Figure 2:
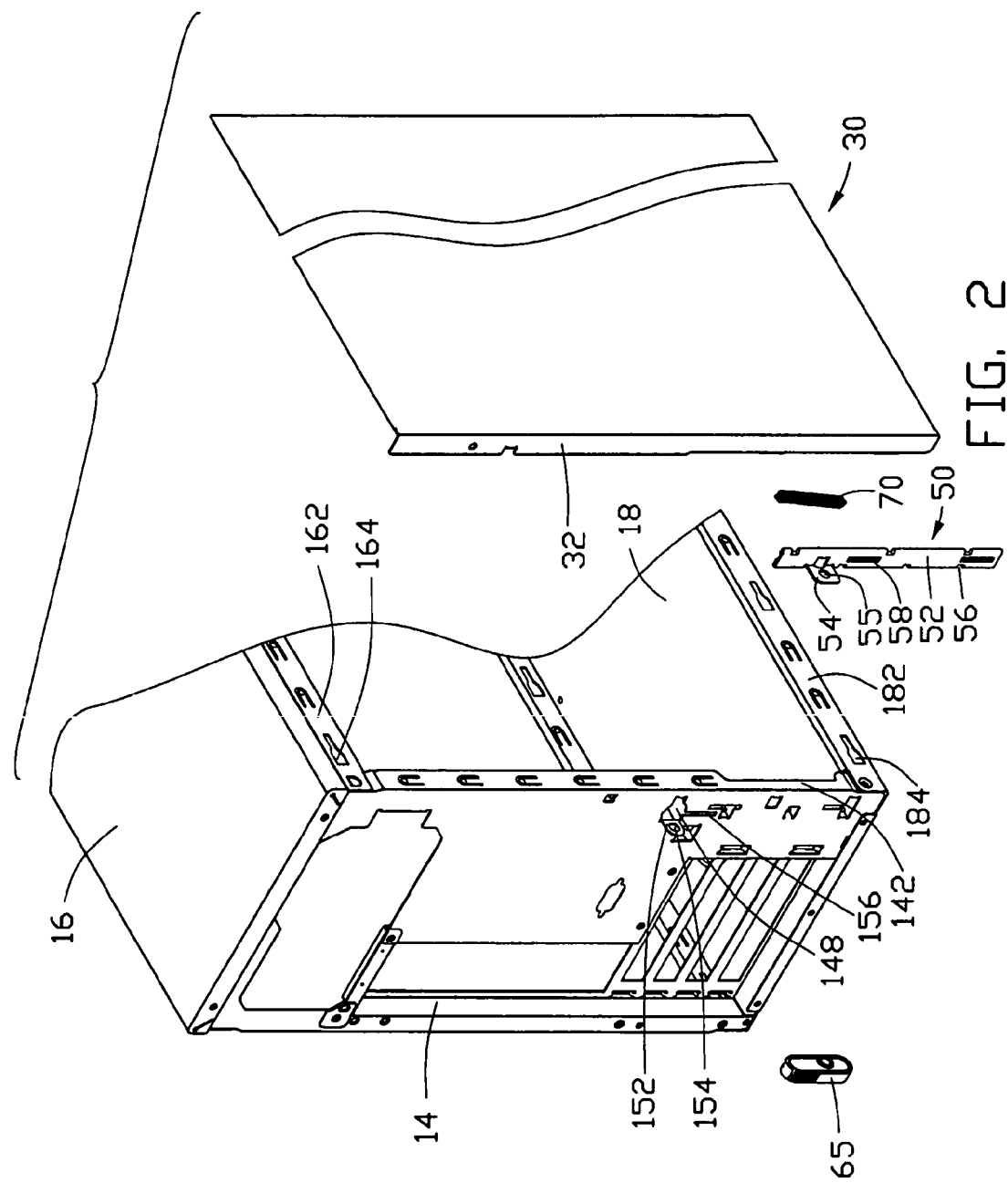
FIG. 2 is similar to FIG. 1, but viewed from another aspect.
Figure 3:
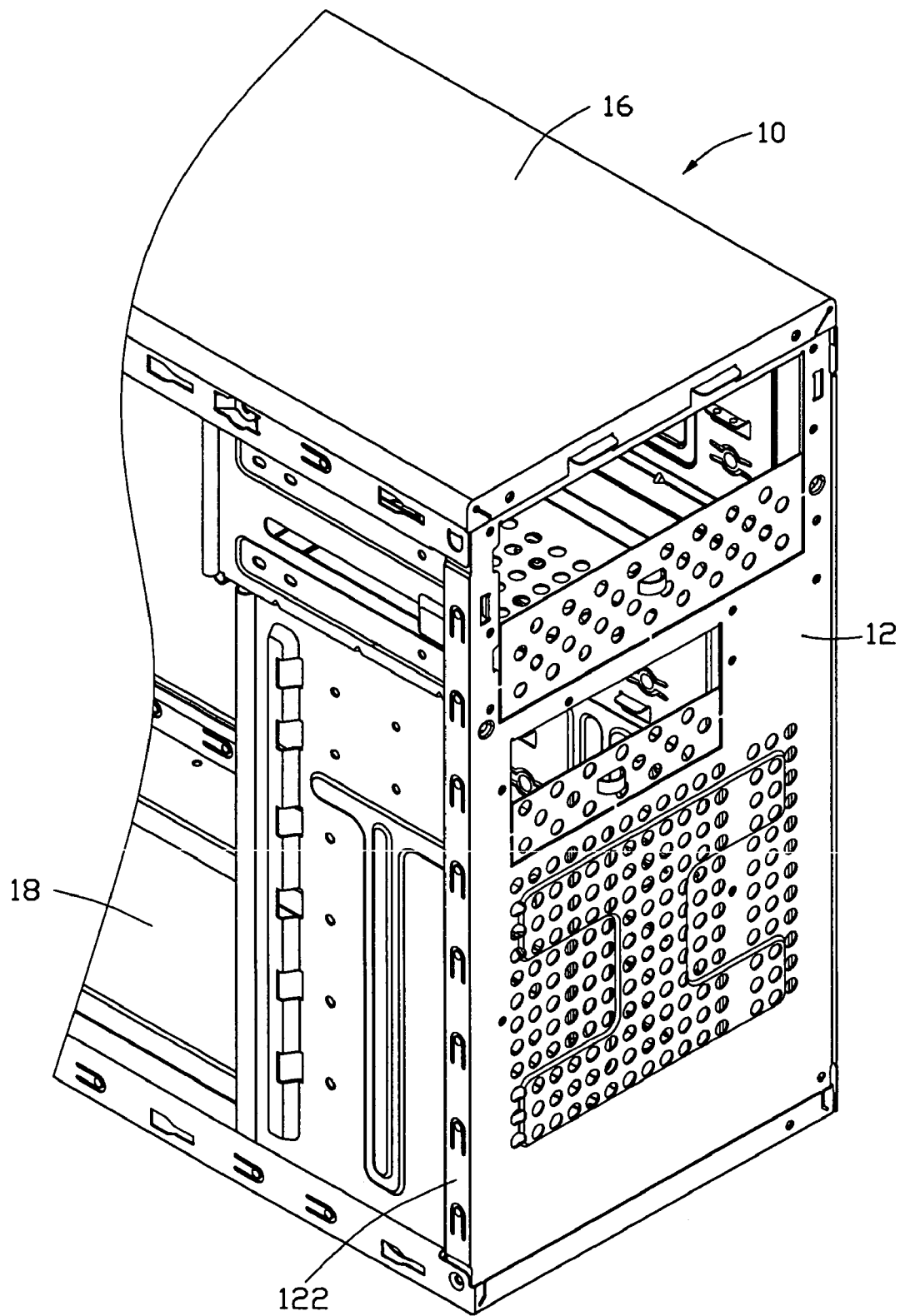
FIG. 3 is an isometric view of the chassis of FIG. 1, but viewed from another aspect.

Referring to FIGS. 1-3, an enclosure of an electronic device like a computer in accordance with a preferred embodiment of the present invention is shown. The computer enclosure includes a chassis 10, a side panel 30, a fixing member 50 and an elastic member 70.

The chassis 10 includes a front panel 12, a rear panel 14, a top panel 16 and a bottom panel 18. The front panel 12, the rear panel 14, the top panel 16 and the bottom panel 18 together form an opening (not labeled). Flanges 122, 142, 162 and 182 are bent inwardly from the front panel 12, the rear panel 14, the top panel 16 and the bottom panel 18 respectively at the opening. A plurality of apertures 144 is defined in the rear panel 14 near the flange 142. Two rows of L-shaped limiting tabs 146 extend inwardly from the rear panel 14 and are situated at two sides of the apertures 144. The two rows of L-shaped limiting tabs 146 form a space for retaining the fixing member 50. A through hole 148 is defined in the rear panel 14 upside the apertures 144 and the limiting tabs 146. A locking tab 152 with a first locking hole 154 defined therein extends outwardly from a side of the through hole 148. A slidable slot 156 is defined in the rear panel 14 from a bottom of the through hole 148. An L-shaped first clasping tab 158 extends inwardly from the rear panel 14 upside the through hole 148. A plurality of splits 164, 184 is defined in the flanges 162, 182 respectively.

The side panel 30 is used to cover the opening of the chassis 10. A bent sheet 32 is perpendicularly bent inwardly from a rear side of the side panel 30. A plurality of L-shaped hooks 34 extends forwardly from an edge of the bent sheet 32. Each hook 34 has a first slanting guiding surface 35 at a top thereof and a second slanting guiding surface 36 at a bottom thereof. The first guiding surface 35 is slanting forwardly and downwardly. The second guiding surface 36 is slanting downwardly and rearward from a distal end of the first guiding surface 35 toward the bent sheet 32. A plurality of clasps 38 protrudes inwardly from a top edge and a bottom edge of the side panel 30, corresponding to the splits 164, 184 of the chassis 10. A plurality of L-shaped clutching tabs 39 extends inwardly and forwardly from a front edge of the side panel 30, corresponding to the flange 122 of the front panel 12 of the chassis 10.

The fixing member 50 includes a body 52, and a locking tab 54 perpendicularly bent rearward from a top of the body 52. A second locking hole 55 is defined in the locking tab 54, corresponding to the first locking hole 154 of the rear panel 14. A plurality of avoiding gaps 56 is defined along two sides of the body 52, corresponding to the limiting tabs 146 of the rear panel 14. A plurality of fixing holes 58 is defined in the body 52, corresponding to the hooks 34 of the side panel 30. A slanting pressing tab 60 extends downwardly and forwardly from a top edge of each fixing hole 58, corresponding to the first guiding surface 35 of a corresponding hook 34 of the side panel 30. A second clasping tab 62 extends forwardly from a top of the body 52, corresponding to the first clasping tab 158 of the rear panel 14. A clasping hole 64 is defined in the second clasping tab 62. An operation member 65 is mounted to the locking tab 54 of the fixing member 50. The operation member 65 defines a retaining slot 66 in a side surface, corresponding to the locking tab 54 of the fixing member 50. A third locking hole 67 is defined in the operation member 65, corresponding to the second locking hole 55 of the locking tab 54. The third locking hole 67 traverses the operation member 65 and the retaining slot 66.

Figure 4:
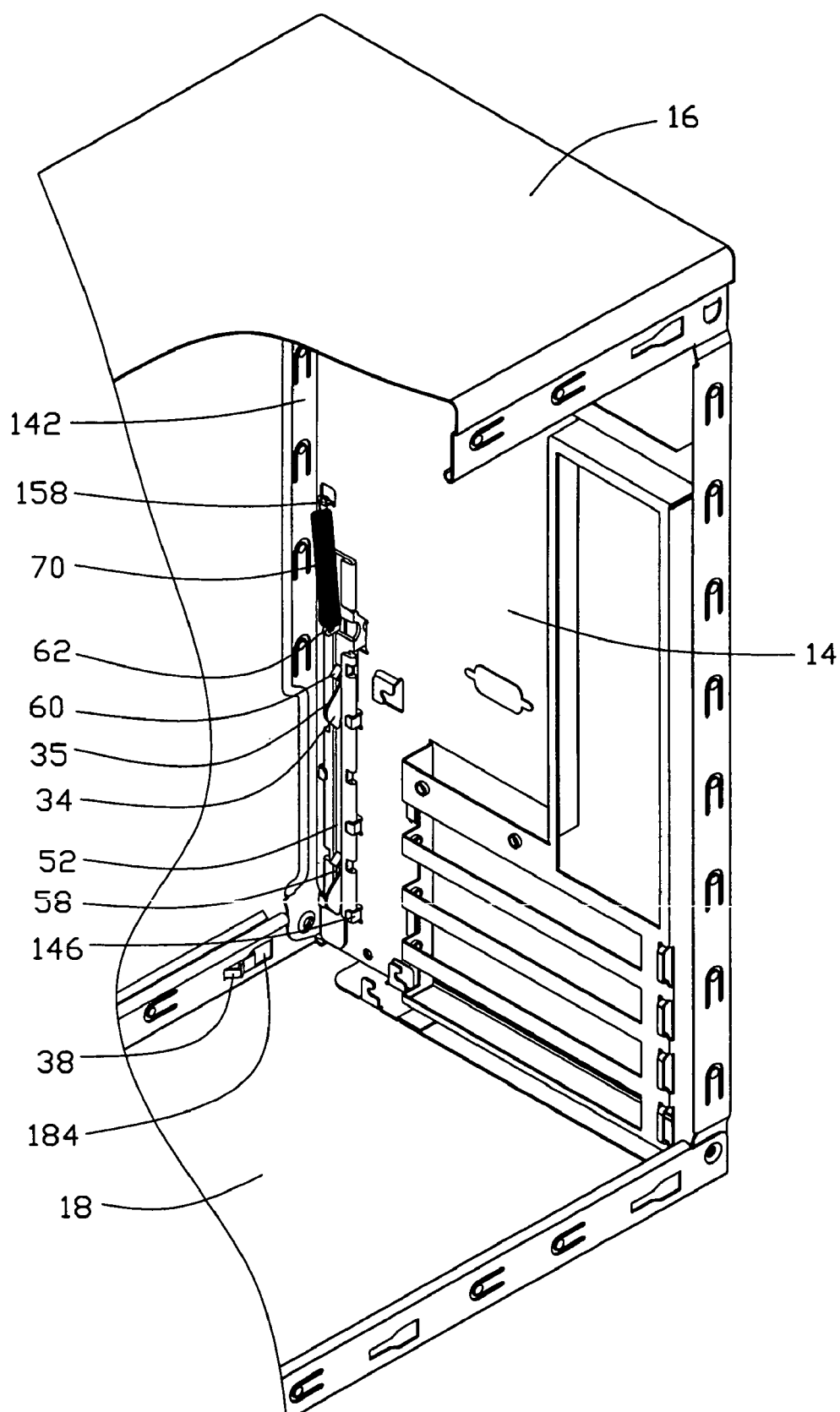
FIG. 4 is an assembled view of FIG. 1.
Figure 5:
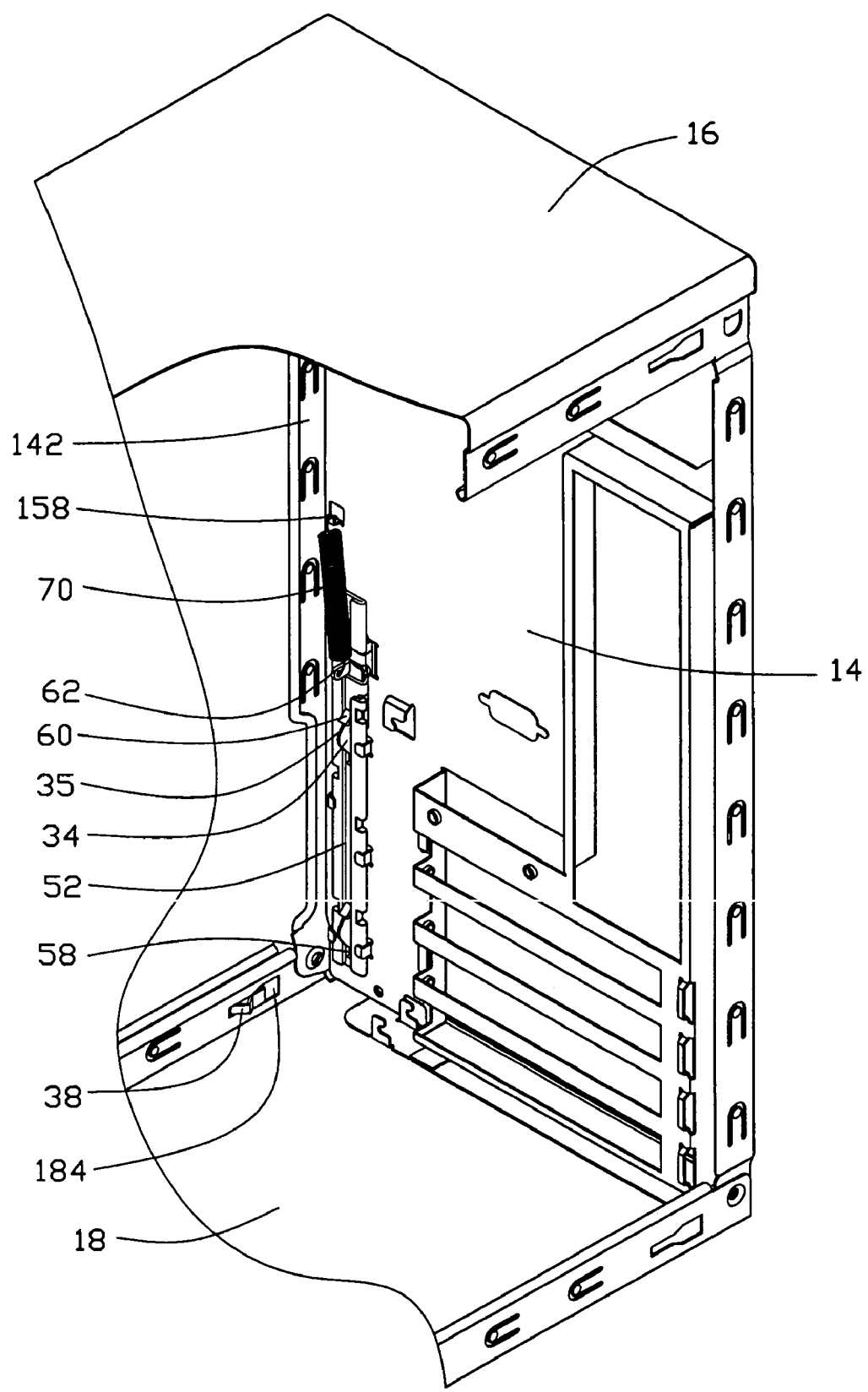
FIG. 5 is an assembled view of FIG. 1, showing the side panel thereof in an unlocking state.
Figure 6:
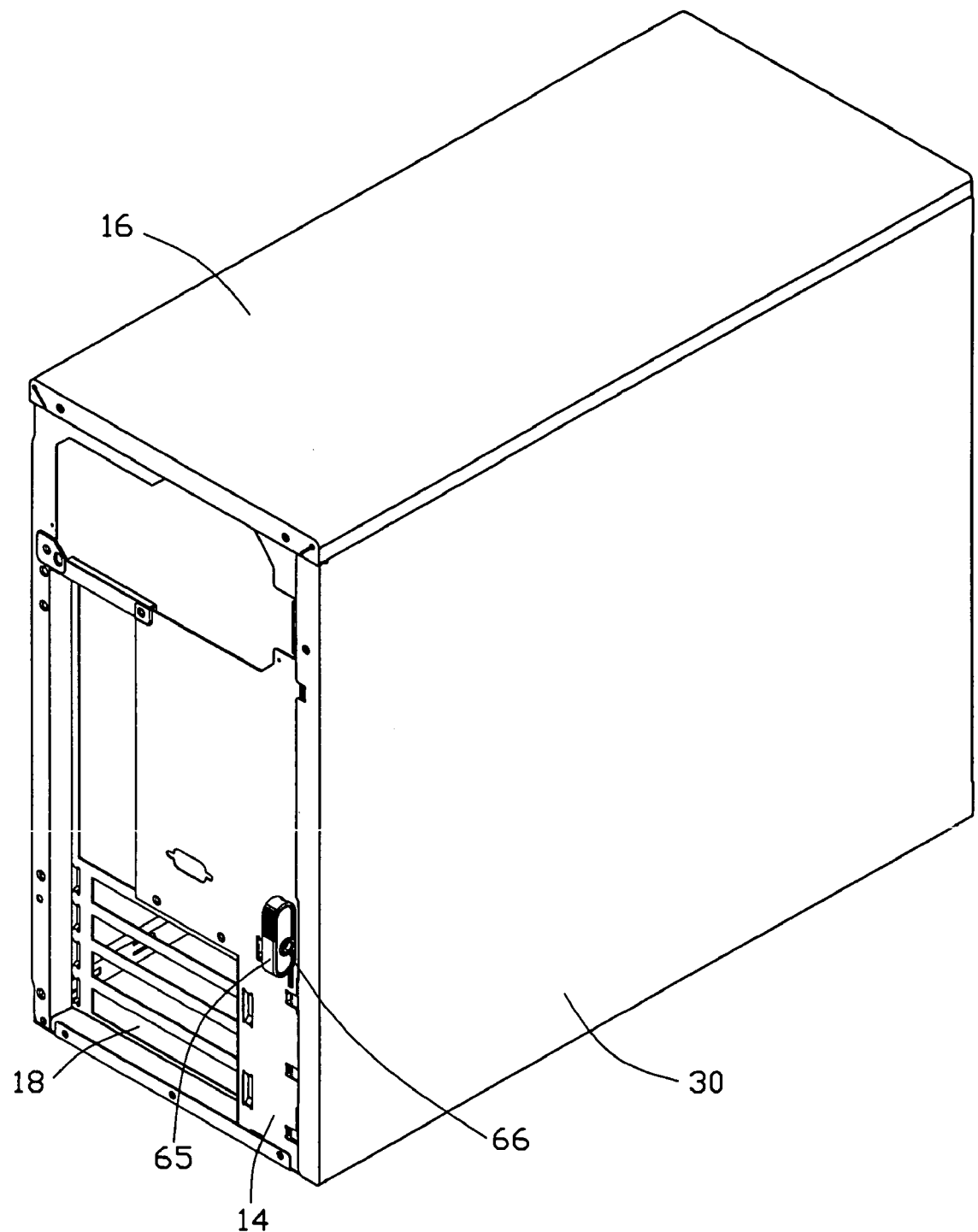
FIG. 6 is an assembled view of FIG. 2.

Referring also to FIGS. 4-6, in assembling the fixing member 50 and the elastic member 70 to the chassis 10, the avoiding gaps 56 of the fixing member 50 align with the corresponding limiting tabs 146 of the rear panel 14 inside the chassis 10. The locking tab 54 of the fixing member 50 traverses the through hole 148 of the rear panel 14, with the second locking hole 55 thereof aligning with the first locking hole 154 of the rear panel 14. The operation member 65 is mounted to the fixing member 50, with the locking tab 54 of the fixing member 50 being retained in the retaining slot 66 of the operation member 65. The third locking hole 67 of the operation member 65 aligns with the second locking hole 55 of the fixing member 30. The operation member 65 is pushed, the fixing member 50 moves till the avoiding gaps 56 thereof stagger the limiting tabs 146 of the rear panel 14. An end of the elastic member 70 clasps the first clasping tab 158 of the rear panel 14. And the other end of the elastic member 70 clasps the second clasping tab 62 through the clasping hole 64. Thus, the fixing member 50 and the elastic member 70 are mounted to the rear panel 14. At this moment, the fixing member 50 is hung by the elastic member 70, with bottom edges of the fixing holes 58 higher to bottom edges of the corresponding apertures 144 of the rear panel 14.

In assembling the side panel 30 to the chassis 10, the side panel 30 is placed above the opening of the chassis 10. The hooks 34 of the side panel 30 align with the corresponding apertures 144 of the rear panel 14 from an exterior. The clasps 38 of the side panel 30 are located in the corresponding splits 164, 184 of the top panel 16 and the bottom panel 18, and the clutching tabs 39 are located at the edge of the flange 122 of the front panel 12. The side panel 30 is pushed forwardly. When the hooks 34 traverse the corresponding apertures 144 of the rear panel 14 and the corresponding fixing holes 58 of the fixing member 50, the second guiding surfaces 36 of the hooks 34 of the side panel 30 press the bottom edges of the corresponding fixing holes 58 of the fixing member 50. The fixing member 50 moves downwardly and stretches the elastic member 70. The hooks 34 of the side panel 30 are disengaged from the corresponding fixing holes 58 of the fixing member 50. The fixing member 50 moves upwardly via the elastic member 70, with the bottom edges of the fixing holes 58 thereof being engaged with the corresponding hooks 34 of the side panel 30. At this moment, the clasps 38 of the side panel 30 are engaged in the corresponding splits 162, 182 of the chassis 10, and the clutching tabs 39 clutch the flange 122 of the front panel 12 of the chassis 10. Thus, the side panel 30 is secured to the chassis 10. A lock (not shown) can traverse the third locking hole 67 of the operation member 65, the second locking hole 55 of the fixing member 50, and the first locking hole 154 of the locking tab 152, then be locked. Thus, the side panel 30 can avoid being disassembled from the chassis 10 by an unauthorized person who does not have a key to the lock.

In disassembling the side panel 30 from the chassis 10, the operation member 65 is pushed downwardly and the fixing member 50 moves downwardly after the lock is removed from the operation member 65. The locking tab 54 slides downwardly in the slidable slot 156 of the rear panel 14. The elastic member 70 is stretched. The pressing tabs 60 of the fixing member 50 press the first guiding surfaces 35 of the corresponding hooks 34 of the side panel 30. The side panel 30 moves rearward. The clasps 38 of the side panel 30 are disengaged from the corresponding splits 162, 184 of the chassis 10, and the clutching tabs 39 are disengaged from the flange 122 of the front panel 12. Thus, the side panel 30 can be removed from the chassis 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

I claim:

1. A computer enclosure comprising:
   a chassis comprising a rear panel, a front panel opposite to the rear panel, a top panel, and a bottom panel which forming an opening together, the rear panel defining an aperture near the opening;
   a fixing member slidably mounted on an inner surface of the rear panel, a fixing hole corresponding to the aperture of the rear panel defined in the fixing member, a pressing tab extending forwardly and downwardly from the fixing member at a top of the fixing hole;
   an elastic member, one end of the elastic member connected to the rear panel, the other end of the elastic member connected to the fixing member; and
   a side panel covering the opening of the chassis, a bent sheet bent inwardly from a rear side of the side panel, a hook corresponding to the fixing hole of the fixing member extending forwardly from an edge of the bent sheet, the hook comprising a first guiding surface extending forwardly and downwardly at a top of the hook, corresponding to the pressing tab of the fixing member, and a second guiding surface extending downwardly and rearward from a distal end of the first guiding surface toward the bent sheet, corresponding to a bottom of the fixing hole of the fixing member;
   wherein the second guiding surface of the hook urges the bottom of the fixing hole of the fixing member to drive the fixing member to move down when assembling the side panel to the chassis, the pressing tab of the fixing member urges the first guiding surface of the hook to drive the side panel to move rearward when the fixing member is moved down to disassemble the side panel from the chassis.

2. The computer enclosure as claimed in claim 1, wherein a flange is bent inwardly from each of the front panel, the rear panel, the top panel, and the bottom panel at the opening.

3. The computer enclosure as claimed in claim 2, wherein a plurality of L-shaped clutching tabs extends inwardly and forwardly from a front edge of the side panel, corresponding to the flange of the front panel of the chassis.

4. The computer enclosure as claimed in claim 2, wherein a first locking tab with a first locking hole being defined therein extends rearward from the rear panel, the fixing member comprises a body and a second locking tab perpendicularly bent rearward from a top of the body, a second locking hole corresponding to the first locking hole is defined in the second locking tab, the fixing hole is defined in the body.

5. The computer enclosure as claimed in claim 4, wherein a through hole corresponding to the second locking tab of the fixing member is defined in the rear panel, a slidable slot is defined in the rear panel from a bottom of the through hole, the first locking tab extends from a side of the through hole.

6. The computer enclosure as claimed in claim 5, wherein an operation member is mounted to the second locking tab of the fixing member, the operation member defines a retaining slot at a side for receiving the second locking tab, a third locking hole traverses the operation member and the retaining hole, corresponding to the first locking hole of the first locking tab and the second locking hole of the second locking tab.

7. The computer enclosure as claimed in claim 4, wherein two rows of L-shaped limiting tabs extend inwardly from the rear panel and situated at two sides of the aperture, a space is formed between the two rows of the limiting tabs to receiving the body of the fixing member.

8. The computer enclosure as claimed in claim 3, wherein a plurality of splits is defined in the flanges of the top panel and the bottom panel of the chassis respectively, a plurality of clasps protrudes inwardly from a top edge and a bottom edge of the side panel, corresponding to the splits of the chassis.

9. The computer enclosure as claimed in claim 1, wherein a second guiding surface is slanting downwardly and rearward from a distal end of the first guiding surface toward the bent sheet.

10. A computer enclosure comprising:
a chassis comprising a rear panel, a front panel opposite to the rear panel, a top panel, and a bottom panel which forming an opening together, the rear panel defining an aperture near the opening;
a fixing member elastically and slidably mounted on an inner surface of the rear panel, a fixing hole corresponding to the aperture of the rear panel defined in the fixing member, a pressing tab extending forwardly and downwardly from the fixing member at a top of the fixing hole; and
a side panel covering the opening of the chassis, a bent sheet bent inwardly from a rear side of the side panel, a hook corresponding to the fixing hole of the fixing member extending forwardly from an edge of the bent sheet, the hook comprising a first guiding surface extending forwardly and downwardly at a top of the hook, corresponding to the pressing tab of the fixing member, and a second guiding surface extending downwardly and rearward from a distal end of the first guiding surface toward the bent sheet, corresponding to a bottom of the fixing hole of the fixing member;
wherein the second guiding surface of the hook urges the bottom of the fixing hole of the fixing member to drive the fixing member to move down when assembling the side panel to the chassis, the pressing tab of the fixing member urges the first guiding surface of the hook to drive the side panel to move rearward when the fixing member is moved down to disassemble the side panel from the chassis.

11. The computer enclosure as claimed in claim 10, further comprising an elastic member, wherein one end of the elastic member is connected to the rear panel, and the other end of the elastic member is connected to the fixing member.

12. The computer enclosure as claimed in claim 11, wherein a first locking tab with a first locking hole being defined therein extends rearward from the rear panel, the fixing member comprises a body and a second locking tab perpendicularly bent rearward from a top of the body, a second locking hole corresponding to the first locking hole is defined in the second locking tab, the fixing hole is defined in the body.

13. The computer enclosure as claimed in claim 12, wherein a through hole corresponding to the second locking tab of the fixing member is defined in the rear panel, a slidable slot is defined in the rear panel from a bottom of the through hole, the first locking tab extends from a side of the through hole.

14. The computer enclosure as claimed in claim 13, wherein an operation member is mounted to the second locking tab of the fixing member, the operation member defines a retaining slot at a side for receiving the second locking tab, a third locking hole traverses the operation member and the retaining hole, corresponding to the first locking hole of the first locking tab and the second locking hole of the second locking tab.

15. The computer enclosure as claimed in claim 14, wherein two rows of L-shaped limiting tabs extend inwardly from the rear panel and situated at two sides of the aperture, a space is formed between the two rows of the limiting tabs to receiving the body of the fixing member.

* * * * *